(12) United States Patent
Bergmans et al.

(10) Patent No.: US 7,152,660 B2
(45) Date of Patent: Dec. 26, 2006

(54) ROTARY LEAD-THROUGH FOR THE COOLANT INFLOW AND OUTFLOW OF A BACK-UP AND/OR CONVEYOR ROLLER WHICH IS ROTABLY HELD IN A BEARING ARRANGEMENT AT THE END

(75) Inventors: Erich Bergmans, Oberhausen (DE); Gerhard Grelewitz, Rheinberg (DE); Walter Krume, Rheinberg (DE)

(73) Assignee: ThyssenKrupp Stahl AG, Inc., Dulsburg (DE)

( * ) Notice: Subject to any disclaimer, the term of this patent is extended or adjusted under 35 U.S.C. 154(b) by 115 days.

(21) Appl. No.: 10/504,346

(22) PCT Filed: Mar. 12, 2003

(86) PCT No.: PCT/EP03/02526

§ 371 (c)(1),
(2), (4) Date: Feb. 24, 2005

(87) PCT Pub. No.: WO03/078093

PCT Pub. Date: Sep. 25, 2003

(65) Prior Publication Data

US 2005/0150631 A1    Jul. 14, 2005

(30) Foreign Application Priority Data

Mar. 16, 2002  (DE) ................................ 102 11 802

(51) Int. Cl.
*B22D 11/12* (2006.01)
(52) U.S. Cl. ...................... 164/448; 164/442
(58) Field of Classification Search ................ 164/448, 164/442

See application file for complete search history.

(56) References Cited

U.S. PATENT DOCUMENTS 6,059,013 A      5/2000  Krume
2003/0136543 A1*  7/2003  Eisenmann et al. ......... 164/448

FOREIGN PATENT DOCUMENTS

| DE | 42 07 042    | 9/1993 |
| DE | 196 13 032   | 6/1997 |
| DE | 197 52 336   | 4/1999 |
| DE | 100 06 630   | 7/2001 |
| EP | 0 859 676    | 8/1998 |
| WO | WO 97/171152 | 5/1997 |

* cited by examiner

*Primary Examiner*—Len Tran
(74) *Attorney, Agent, or Firm*—Proskauer Rose LLP

(57) ABSTRACT

The invention relates to a rotary lead-through for the coolant inflow and outflow of a back-up and/or conveyor roller (1) which is held in a bearing arrangement at the end at least by means of bearing journals (10) located in bearing blocks (11), in particular in a continuous casting plant. To compensate for the axial movement and oscillating movement of the back-up and/or conveyor roller during operation, the bearing (9) at one end, to which the coolant inflow line and the coolant outflow line is connected, is a fixed axial bearing which is nevertheless able to absorb oscillating movement, while the other bearing is a detached axial bearing. In this way it is possible to provide on the fixed axial bearing a rotary lead-through, without a compensator, between the bearing journal (10) and a covering plate (12), wherein a fixed sleeve (16), sealed in the bearing journal (10), is sealed at the covering plate (12) by means of a rotary shaft sealing ring (18) which makes it possible for relative rotary movement and oscillating movement to occur.

4 Claims, 2 Drawing Sheets

ROTARY LEAD-THROUGH FOR THE COOLANT INFLOW AND OUTFLOW OF A BACK-UP AND/OR CONVEYOR ROLLER WHICH IS ROTABLY HELD IN A BEARING ARRANGEMENT AT THE END

The invention relates to a rotary lead-through for the coolant inflow and outflow of a back-up and/or conveyor roller which is held in a bearing arrangement at the end at least by means of bearing journals located in bearing blocks, in particular in a continuous casting plant, comprising a covering plate which covers at least one of the bearing journals at the end, wherein said covering plate is supported by the associated bearing block, wherein coolant lines are connected to said rotary lead-through, and comprising a seal which acts between the bearing plate and the bearing journal, which seal, together with a sleeve inserted in the cover plate so as to be sealed, makes possible relative rotary movement between the covering plate and the bearing journal, and comprising a line for coolant inflow and outflow, wherein said line extends through an axial borehole in the back-up and/or conveyor roller, wherein said line for coolant inflow and outflow, together with the borehole and the sleeve, forms a ring channel for coolant inflow and outflow.

BACKGROUND OF THE INVENTION

Rotary lead-throughs of this type are well known. In these rotary lead-throughs, the seal between the covering plate and the bearing journal makes it possible for the conveyor roller to make-both axial movements and oscillating movements relative to the bearing blocks and the covering plate. In the first known rotary lead-through (EP 0 859 676 B1), the seal is a ring-shaped flange-like diaphragm made of a flexible material, connected on the one hand to the face of the bearing journal, and on the other hand to the bushing which is seated in the covering plate so as to provide a seal, and which delimits the ring channel. In the second known rotary lead-through (DE 197 52 336C1, DE 42 07 042 C1) the flexible seal comprises a flexible hose which on the one hand is connected to the bearing journal, and on the other hand to the sleeve which is seated in the covering plate. Both designs are associated with a disadvantage in that, due to the required ability to allow both axial movements and oscillating movements, they are complex in their design and installation, and due to their flexible components only have a limited service life.

SUMMARY OF THE INVENTION

It is thus the object of the invention to develop a rotary lead-through which is simple in design and features a long service life.

In a rotary lead-through of the type mentioned in the introduction, this object is met in that the bearing at one end is a fixed axial bearing, while the bearing adjacent to said bearing is a detached axial bearing; in that the sleeve has been inserted into the bearing journal so as to be sealed at one end and so as to be axially fixed; and in that on the other end of the sleeve, which end has been inserted in the covering plate, that seal is seated which is effective between the bearing journal and the covering plate, which seal, as a rotary shaft sealing ring, provides sealing action to the sleeve and is sealed and axially fixed in the covering plate. In this arrangement, in particular the central line which extends through the borehole and the sleeve is held by the sleeve.

Unlike the situation in both known rotary lead-throughs, the rotary lead-through according to the invention does not have to absorb any axial movement of the roller but only oscillating movement. These relatively modest excursions during oscillating movement can easily be absorbed by a rotary shaft sealing ring between the sleeve fixed in the bearing journal and the covering plate. In contrast to this, known rotary lead-throughs required multi-part seals with a flexible compensator hose or flange. There is no longer a need for telescopic axial compensation for the axial line. Said line can now be made in a single part and can be fixed in the axially-fixed sleeve. Since there is no longer a need for flange-shaped or hose-shaped flexible parts of the seal, this results in a significantly simpler design which provides a longer service life when compared to rotary lead-throughs according to the state of the art.

The rotary shaft seal preferably comprises a rigid ring body which is arranged with radial play in relation to the sleeve, wherein at least one inner groove of said ring body, which groove faces the sleeve, comprises a rotation ring which on the one hand is seated on the sleeve so as to provide a seal, and on the other hand, while maintaining radial mobility, provides a seal in the groove at the two faces of said groove; and wherein in at least one outer ring groove of said rotation ring an O-ring seal is seated which provides a seal on a sealing face of the covering plate. Such seals are known per se and are commercially available under the trade name of "Prelonring". Such a seal provides special advantages in that it allows oscillating movement and deviations from the centre of up to several millimeters while still providing reliable sealing action. The frictional losses of such a seal, between the parts which move in relation to each other, are small.

According to a further embodiment of the invention, at its end facing away from the coveting plate, the sleeve comprises an attachment head through which the line leads with a precise fit, with said attachment head comprising openings for the coolant between various axial sections of the ring channel.

BRIEF DESCRIPTION OF THE DRAWINGS

Below, the invention is described in more detail with reference to a drawing which shows one embodiment, as follows.

DETAILED DESCRIPTION OF THE INVENTION

Figure 1:
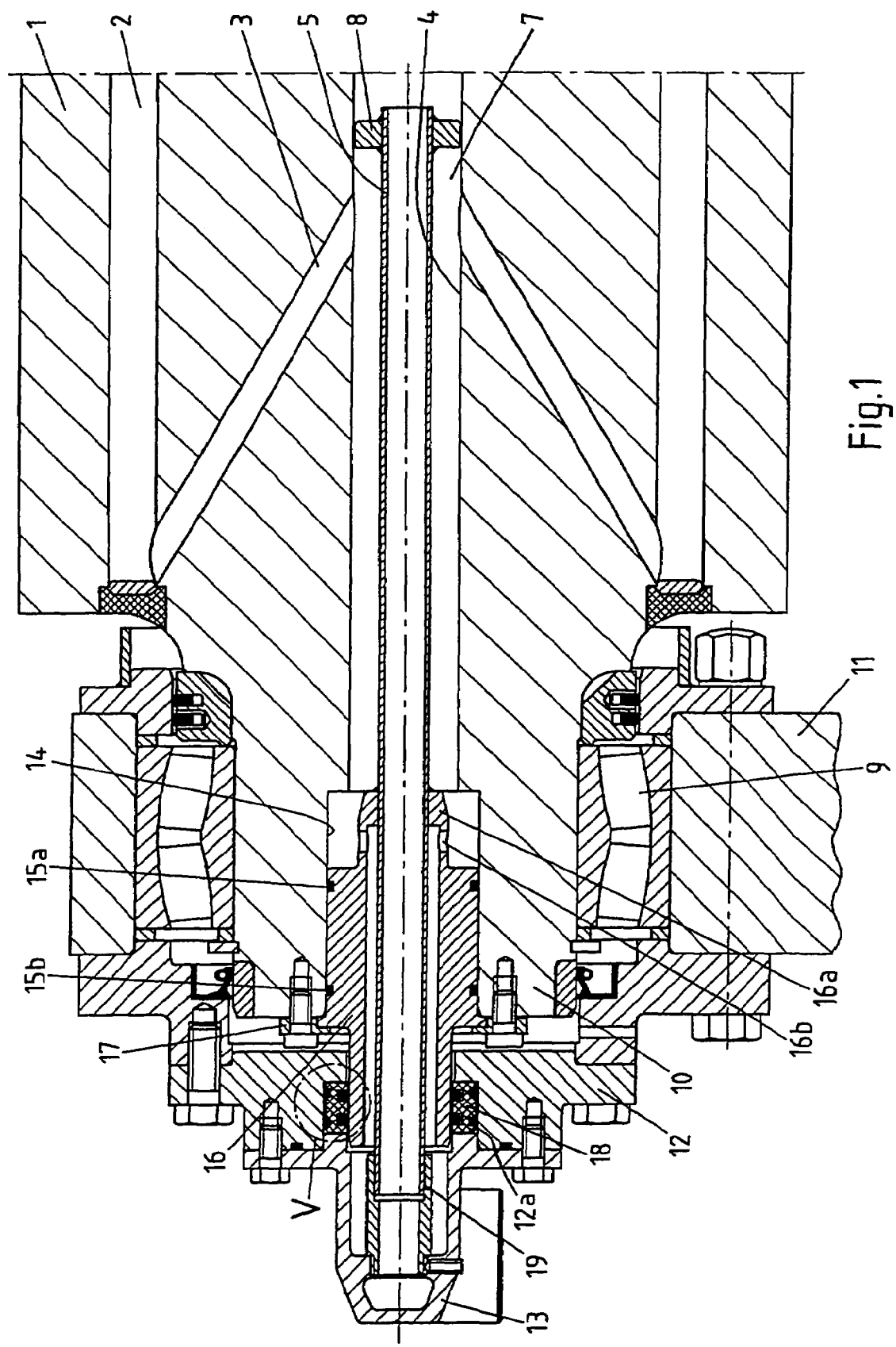
FIG. 1 a rotary lead-through in the region of a bearing arrangement at one end.

A water-cooled back-up and/or conveyor roller 1 in its outer region comprises axially aligned channels 2 as well as channels 3 which join said axially aligned channels 2 or which emanate from said axially aligned channels 2, with said channels 3 leading to a central distribution system. The central distribution system comprises a central borehole 4 in the back-up and/or conveyor roller 1, and a tubular line 5, arranged therein, which tubular line 5 forms a central inflow channel 6 for the coolant, and together with the borehole 4 forms a ring channel 7 for the outflow of the coolant.

At its end, the line 5 comprises a blocking ring 8 which separates the ring channel 7 from a rear section of the borehole 4 so that the coolant supplied byway of the line 5 circulates and is returned to the ring channel 7 by way of the axially extending channels 2 and 3.

FIG. 1 shows only part of the back-up roller 1. As a rule, the back-up roller comprises two or more sections, of which each section is held at the end (DE 100 03 846 A1). In the case of the bearings of a back-up roller section, one bearing is a fixed axial bearing, while the other is a detached bearing. The bearing which is not shown in the drawing is a detached bearing which is designed such that it can absorb axial movement and oscillating movement of the back-up roller 1. Bearings which are suitable for this are for example roller bearings or spherical roller bearings made by the company SKF, which bearings are commercially available under the name of "CARB". In contrast to this, the other bearing 9, which is shown in the drawing, is a fixed axial bearing which is able to absorb oscillating movement. The spherical roller bearing shown in the drawing is a typical design of such a bearing.

The bearing journal 10 of the back-up roller 1 is held in a stationary bearing block 11 by way of the already mentioned bearing 9. On a face of the bearing block 11, a covering plate 12 is attached which comprises a distributor head 13 with plug-type fittings for inflows and outflows of coolant.

Figure 2:
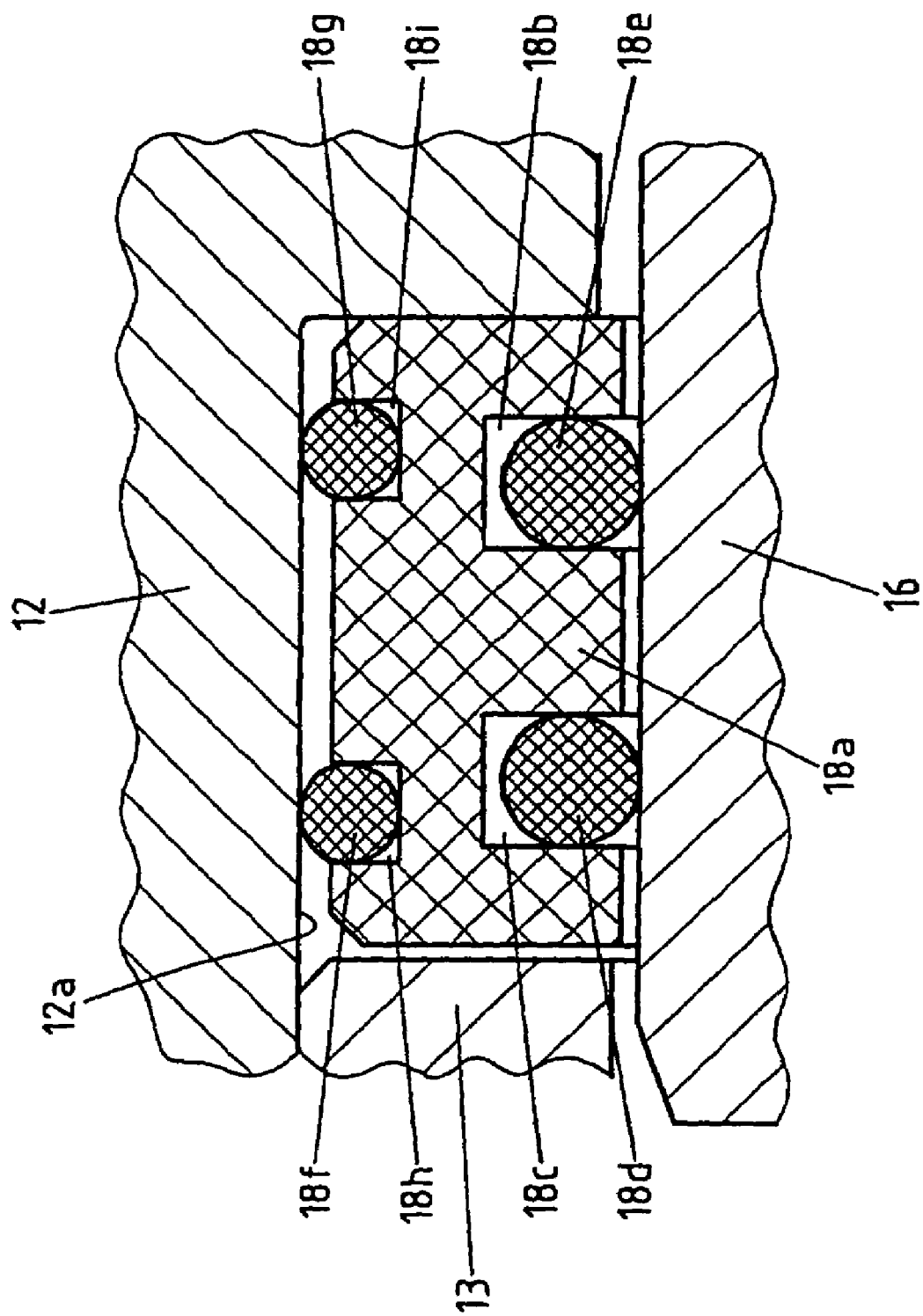
FIG. 2 an enlarged view of a detail V of FIG. 1

Seated in a central borehole 14, arranged at one end, of the bearing journal 10, and sealed with O-ring seals 15a, 15b, is a sleeve 16 which is held, at the face, to the bearing journal 10 by means of an assembly ring 17 so as to be non-rotatable and axially fixed. A section of the sleeve 16, which section is of smaller cross-section, extends into the covering plate 1, where said sleeve 16 is rotatably sealed by a rotary shaft sealing ring 18. As shown in FIG. 2, this rotary shaft sealing ring 18 comprises a rigid ring body 18a in which two ring grooves 18b, 18c are provided on the side of the sleeve 16, wherein a rotation ring 18d, 18e which is seated on the sleeve 16 so as to be non-rotating and sealing, is held in each of said ring grooves 18b, 18c. Each rotation ring 18d, 18e is movable in radial direction in the groove 18b, 18c, while at the same time said rotation ring 18d, 18e seals the associated radial surfaces. Furthermore, O-ring seals 18f, 18g are provided in outer ring grooves 18h, 18i, which seal a cylindrical area 12a of the covering plate 12. It is understood that ring seals other than the rotary shaft sealing ring 18 shown in this embodiment are suitable for providing a seal between the rotatably held sleeve 16 and the non-rotatable covering plate 12.

One end of the tubular central line 5 is accommodated in a shoulder 19 which is fixed in the distributor head 13. Furthermore, the line 5 is held in an attachment head 16a of the sleeve 16, through which attachment head 16a it passes with precise fit, wherein said line 5 is welded to said attachment head 16a. Directly in front of the head 16a, the sleeve 16 comprises radial openings 16b by way of which the sections of the ring channel 7 between the line 5 and the borehole 4 and between the line 5 and the sleeve 16 are interconnected.

The invention provides particular advantages in that in the region of the bearing arrangement of the back-up and/or conveyor roller 1 on one end no components which compensate for axial movement are required. The central axial line 5 with the sleeve 16 can therefore be fixed to the bearing journal 10. The only relative movement occurring as a oscillating movement between the back-up and/or conveyor roller 1 and on the covering plate 12 with distributor head 13 fixed on the stationary bearing block 11 can easily be absorbed by the seal 18, in the form of a rotary shaft sealing ring, between the sleeve 16 fixed to the bearing journal 10, and the stationary cover plate 12. All this makes it possible to have a simpler design—a factor which also has a positive effect on easier service and maintenance.

The invention claimed is:

1. A rotary lead-through for the coolant inflow and outflow of a back-up and/or conveyor roller (1) which is held in a bearing arrangement at the end at least by means of bearing journals (10) located in bearing blocks (11), in particular in a continuous casting plant, comprising a covering plate (12) which covers at least one of the bearing journals (10) at the end, wherein said covering plate (12) is supported by the associated bearing block (11), wherein coolant lines are connected to said rotary lead-through, and comprising a seal (18) which acts between the bearing plate (12) and the bearing journal (10), which seal (18), together with a sleeve (16) inserted in the cover plate (12) so as to be sealed, makes possible relative rotary movement between the covering plate (12) and the bearing journal (10), and comprising a line (5) for coolant inflow and outflow, wherein said line (5) extends through an axial borehole (4) in the back-up and/or conveyor roller (1), wherein said line (5) for coolant inflow and outflow, together with the borehole (4) and the sleeve (16), forms a ring channel (7) for coolant inflow and outflow, characterised in that the bearing (9) at one end is a fixed axial bearing, while the bearing adjacent to said bearing (9) is a detached axial bearing; in that the sleeve (16) has been inserted into the bearing journal (10) so as to be sealed at one end and so as to be axially fixed; and in that on the other end of the sleeve (16), which end has been inserted in the covering plate (12), the seal (18) is seated which is effective between the bearing journal (10) and the covering plate (12), which seal (18), as a rotary shaft sealing ring, provides sealing action to the sleeve (16) and is sealed and axially fixed in the covering plate (12).

2. The rotary lead-through according to claim 1, characterised in that the central line (5) which extends through the borehole (4) and the sleeve (16) is held by the sleeve (16).

3. The rotary lead-through according to claim 1 or 2, characterised in that the rotary shaft seal (18) comprises a rigid ring body (18a) which is arranged with radial play in relation to the sleeve (16), wherein at least one inner ring groove (18b, 18c) which faces the sleeve (16) comprises a rotation ring (18d, 18e) which on the one hand is seated on the sleeve (16) so as to provide a seal, and on the other hand, while maintaining radial mobility, provides a seal in the groove (18b, 18c) at the two faces of said groove (18b, 18c); and wherein in at least one outer ring groove (18h, 18i) of said rotation ring (18d, 18e) an O-ring seal (18f, 18g) is seated which provides a seal on a sealing face (12a) of the covering plate (12).

4. The rotary lead-through according to any one of claims 1 to 3, characterised in that at its end facing away from the covering plate (12), the sleeve (16) comprises an attachment head (16a) through which the line (5) leads with a precise fit, with said attachment head (16a) comprising openings (16b) for the coolant between various axial sections of the ring channel (7).

* * * * *